United States Patent
Saito et al.

(10) Patent No.: US 12,054,913 B2
(45) Date of Patent: Aug. 6, 2024

(54) CONSTRUCTION MACHINE

(71) Applicant: HITACHI CONSTRUCTION MACHINERY CO., LTD., Tokyo (JP)

(72) Inventors: Yuho Saito, Tokyo (JP); Hidekazu Moriki, Tokyo (JP); Shinya Imura, Tsuchiura (JP); Kouji Shiwaku, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 457 days.

(21) Appl. No.: 17/422,643

(22) PCT Filed: Feb. 14, 2020

(86) PCT No.: PCT/JP2020/005800
§ 371 (c)(1),
(2) Date: Jul. 13, 2021

(87) PCT Pub. No.: WO2020/184065
PCT Pub. Date: Sep. 17, 2020

(65) Prior Publication Data
US 2021/0388578 A1 Dec. 16, 2021

(30) Foreign Application Priority Data
Mar. 14, 2019 (JP) ................ 2019-047081

(51) Int. Cl.
*E02F 9/00* (2006.01)
*B60Q 9/00* (2006.01)
(Continued)

(52) U.S. Cl.
CPC ............ *E02F 9/2033* (2013.01); *B60Q 9/008* (2013.01); *E02F 3/32* (2013.01); *E02F 9/24* (2013.01); *E02F 9/262* (2013.01); *H04W 4/023* (2013.01)

(58) Field of Classification Search
CPC ... E02F 9/2033; E02F 3/32; E02F 9/24; E02F 9/262; B60Q 9/008; H04W 4/023
(Continued)

(56) References Cited

U.S. PATENT DOCUMENTS

2017/0116862 A1* 4/2017 Inoue ................ G08G 1/161
2019/0093317 A1   3/2019 Izumikawa
(Continued)

FOREIGN PATENT DOCUMENTS

JP   2011-028729 A   2/2011
JP   2012-21290 A    2/2012
(Continued)

OTHER PUBLICATIONS

International Search report of PCT/JP2020/005800 dated Apr. 21, 2020.
(Continued)

*Primary Examiner* — Tiffany P Young
(74) *Attorney, Agent, or Firm* — MATTINGLY & MALUR, PC

(57) ABSTRACT

A construction machine includes a posture sensor provided on a front member of a front work implement. An external environment recognition device detects an object around a main body, and a controller calculates a dead angle range from a recognition range of the external environment recognition device. An assumed movement range in which a moving body is assumed to exist in the dead angle range in a period of time determined in advance is calculated; and a movable range within which the front work implement is movable in a period of time determined in advance is calculated on the basis of the posture information detected by the posture sensor. Preventative control is then performed for preventing contact between the moving body and the front work implement on the basis of the assumed move-
(Continued)

ment range of the moving body and the movable range of the front work implement.

4 Claims, 13 Drawing Sheets

(51) Int. Cl.
  *E02F 3/32* (2006.01)
  *E02F 9/20* (2006.01)
  *E02F 9/24* (2006.01)
  *E02F 9/26* (2006.01)
  *H04W 4/02* (2018.01)

(58) Field of Classification Search
  USPC .......................................................... 701/50
  See application file for complete search history.

(56) References Cited

U.S. PATENT DOCUMENTS

| | | |
|---|---|---|
| 2019/0352885 A1 | 11/2019 | Kurokami et al. |
| 2020/0048871 A1 | 2/2020 | Nishizawa et al. |

FOREIGN PATENT DOCUMENTS

| | | | | |
|---|---|---|---|---|
| JP | 2012104029 A | * | 5/2012 | |
| JP | 2016-024685 A | | 2/2016 | |
| JP | 2018-093501 A | | 6/2018 | |
| JP | 2018-172857 A | | 11/2018 | |
| JP | 2018-172943 A | | 11/2018 | |
| JP | 2020077266 A | * | 5/2020 | ............ B60W 30/18 |
| JP | 2020135215 A | * | 8/2020 | ............... B60Q 1/46 |
| WO | WO-2012033173 A1 | * | 3/2012 | ......... G06K 9/00362 |
| WO | WO-2016104198 A1 | * | 6/2016 | |
| WO | 2016/016922 A1 | | 4/2017 | |
| WO | 2018/008542 A1 | | 1/2018 | |
| WO | 2019/039593 A1 | | 2/2019 | |

OTHER PUBLICATIONS

International Preliminary Report on Patentability received in corresponding International Application No. PCT/JP2020/005800 dated Sep. 23, 2021.
Korean Office Action received in corresponding Korean Application No. 10-2021-7027634 dated Jan. 18, 2023.

* cited by examiner

CONSTRUCTION MACHINE

TECHNICAL FIELD

The present invention relates to a construction machine.

BACKGROUND ART

In construction machines such as hydraulic excavators in the construction civil engineering industry, as measures for preventing contact of a front work implement, which performs work, with a worker, a technique is available by which the working velocity of the front work implement is controlled as disclosed in Patent Document 1.

Patent Document 1 discloses a swing work machine that includes an attachment attached for swing motion to a track structure (base), a swing mechanism that swings the attachment, a controller that controls the swing mechanism, and an intruding object detection device that detects a position of an intruding object having intruded a working area. The controller controls the swing motion of the attachment on the basis of a first physical quantity that relates at least to an angular velocity of the attachment at the current point of time and an inertial moment of the attachment at the current point of time and the position of the intruding object detected by the intruding object detection device.

PRIOR ART DOCUMENT

Patent Document
Patent Document 1: JP-2012-21290-A

SUMMARY OF THE INVENTION

Problem to be Solved by the Invention

However, in the conventional technique described above, since this does not take it into consideration that a possibility that a moving body may exist in the dead angle of a detected object, when a moving body appears from the dead angle, the conventional technique cannot deal with this sufficiently.

The present invention has been made taking the foregoing into consideration, and it is an object of the present invention to provide a construction machine that can deal also with a moving body in a dead angle of an object and that can prevent contact between a front work implement and a moving body with a higher degree of certainty.

Means for Solving the Problem

Although the present application includes plural means for solving the subject described above, by way of example, there is provided a construction machine that includes: a main body including a lower track structure and an upper swing structure provided swingably with respect to the lower track structure; a front work implement of articulated type attached to the upper swing structure and including a plurality of front members pivotably connected to each other; and a plurality of actuators that individually drive the plurality of front members of the front work implement, the construction machine including: a posture sensor that is provided on each of the front members of the front work implement and detects posture information of the front member; an external environment recognition device that detects an object around the main body; and a controller configured to calculate a dead angle range that is a range that becomes a dead angle from a recognition range of the external environment recognition device, the dead angle arising from an object recognized by the external environment recognition device, to calculate an assumed movement range that is a range within which a moving body assumed to exist in the dead angle is movable in a period of time determined in advance, to calculate a movable range that is a range within which the front work implement is movable in a period of time determined in advance on a basis of the posture information detected by the posture sensor, and to perform preventive control for preventing contact between the moving body and the front work implement on a basis of the assumed movement range of the moving body and the movable range of the front work implement.

Advantages of the Invention

According to the present invention, the construction machine can deal also with a moving body in a dead angle of an object sufficiently and can prevent contact between the front work implement and a moving body with a higher degree of certainty.

MODES FOR CARRYING OUT THE INVENTION

In the following, embodiments of the present invention are described with reference to the drawings. It is to be noted that, although the embodiments of the present invention are described exemplifying a hydraulic excavator that includes a front work implement as an example of a construction machine, the present invention can be applied also to a wheel loader or other construction machines including a work implement such as a crane.

First Embodiment

A first embodiment of the present invention is described with reference to FIGS. 1 to 13.

Figure 1:
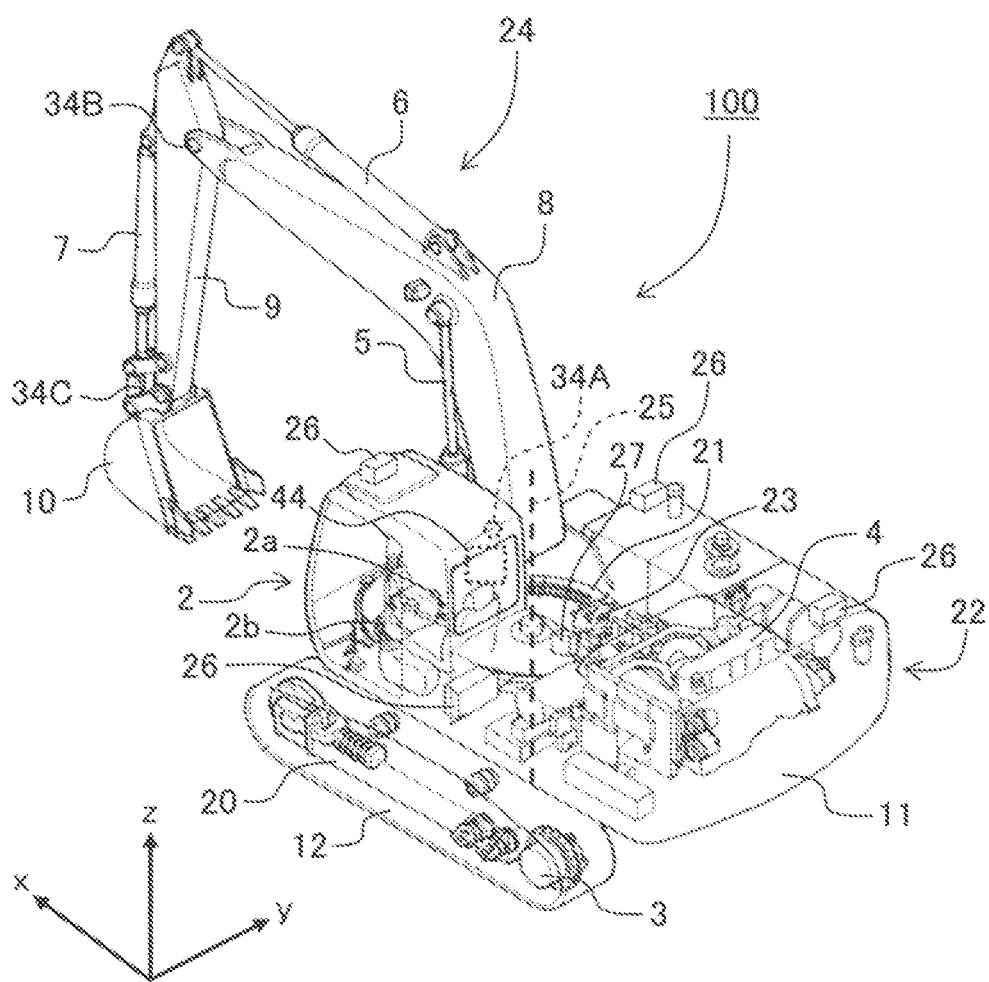
FIG. 1 is a view schematically depicting an appearance of a hydraulic excavator that is an example of a construction machine according to a first embodiment.

FIG. 1 is a view schematically depicting an appearance of a hydraulic excavator that is an example of a construction machine according to the present embodiment. Further, FIG. 2 is a side elevational view schematically depicting an appearance of the hydraulic excavator.

Figure 2:
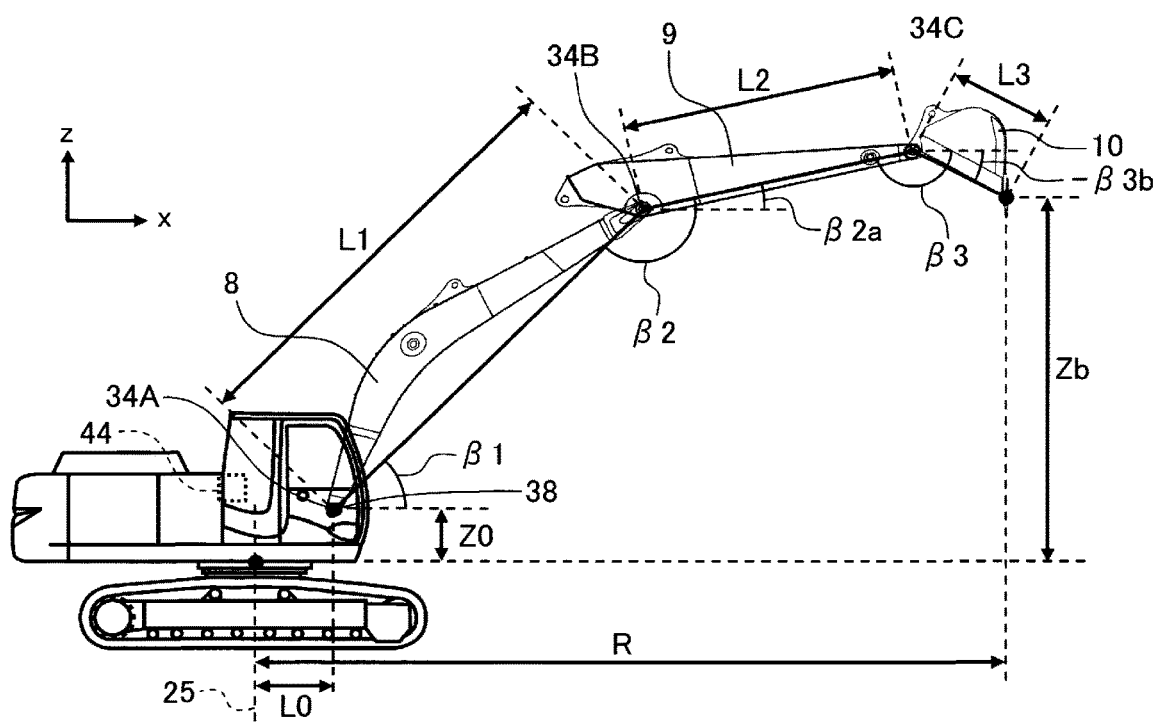
FIG. 2 is a side elevational view schematically depicting an appearance of the hydraulic excavator.

Referring to FIGS. 1 and 2, the hydraulic excavator 100 includes a front work implement 24 of articulated type configured by connecting a plurality of driven members (a boom 8, an arm 9, and a bucket (work tool) 10), which are individually pivoted in a vertical direction, and an upper swing structure 22 and a lower track structure 20 that configure an excavator main body (hereinafter referred to simply "main body"). The upper swing structure 22 is provided for swing motion on and relative to the lower track structure 20 through a swing mechanism 21. The swing mechanism 21 includes a swing motor 23 and a swing angle sensor 27. The upper swing structure 22 is driven to swing with respect to the lower track structure 20 by the swing motor 23, and the swing angle thereof with respect to the lower track structure 20 is detected by the swing angle sensor 27.

The boom 8 of the front work implement 24 is supported at a proximal end thereof pivotably in the vertical direction at a front portion of the upper swing structure 22. The arm 9 is supported at one end thereof pivotably in the vertical direction at an end portion (distal end) of the boom 8 different from the proximal end of the boom 8, and the bucket 10 is supported pivotably in the vertical direction at the other end of the arm 9. The boom 8, the arm 9, the bucket 10, the upper swing structure 22, and the lower track structure 20 are driven by a boom cylinder 5, an arm cylinder 6 and a bucket cylinder 7 which are hydraulic actuators, the swing motor 23, and left and right track motors 3 (note that only one of the track motors is depicted), respectively.

Here, a main body coordinate system is set which has the origin at a point of intersection of a swing central axis 25 of the upper swing structure 22 and a lower face of the upper swing structure 22 and has a z-axis along the swing central axis 25 with the upper side from the origin as positive, an x-axis that extends in a forward and rearward direction perpendicular to the z-axis with the forward direction from the origin as positive and a y-axis that extends in a leftward and rightward direction perpendicular to the z-axis and the x-axis with the rightward direction from the origin as positive.

A cab 2 to be boarded by an operator is mounted on the front left side of the upper swing structure 22. Further, a controller 44 for controlling operation of the entire hydraulic excavator 100 is arranged on the upper swing structure 22. The cab 2 includes operation levers (operation devices) 2a and 2b for outputting operation signals for operating the hydraulic actuators 5 to 7 and 23. Though not depicted, the operation levers 2a and 2b are individually tiltable forwardly, rearwardly, leftwardly and rightwardly, and each includes a detection device not depicted that electrically detects a tilting amount of a lever which is an operation signal, namely, a lever operation amount. A lever operation amount detected by the detection device is outputted to the controller 44 (hereinafter described) through an electric line. Specifically, operations of the hydraulic actuators 5 to 7 and 23 are individually allocated to the forward and backward directions or the leftward and rightward directions of the operation levers 2a and 2b.

Motion control of the boom cylinder 5, the arm cylinder 6, the bucket cylinder 7, the swing motor 23, and the left and right track motors 3 is performed by controlling directions and flow rates of hydraulic operating oil supplied from a hydraulic pump apparatus which is driven by a prime mover such as an engine or an electric motor not depicted, to the hydraulic actuators 3, 5 to 7 and 23, using control valves or the like. The control valves are controlled in operation by the controller 44 on the basis of operation signals from the operation levers 2a and 2b, and operation of the hydraulic actuators 5 to 7 and 23 is controlled by the control valves.

Figure 3:
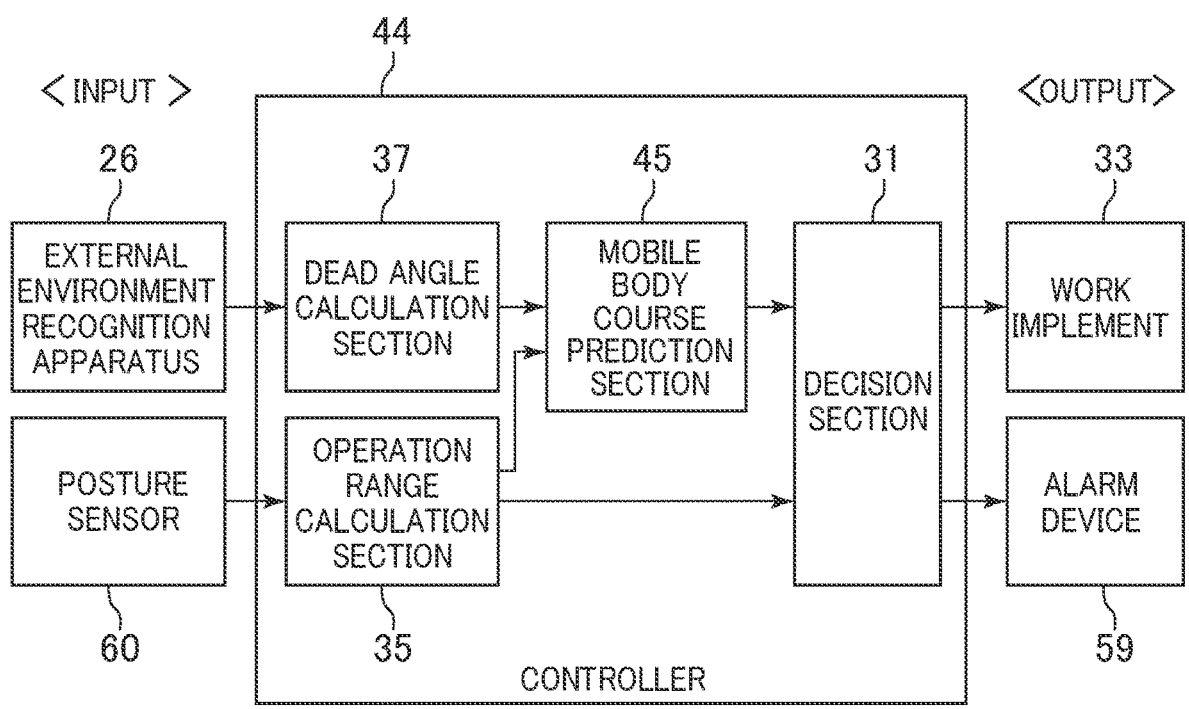
FIG. 3 is a functional block diagram schematically depicting part of processing functions of a controller incorporated in the hydraulic excavator according to the first embodiment.

Posture sensors 34A, 34B, and 34C are attached to a proximal portion of the boom 8, a connection portion between the boom 8 and the arm 9, and a connection portion between the arm 9 and the bucket 10, respectively. The posture sensors 34A, 34B, and 34C are mechanical angle sensors, for example, like potentiometers. As depicted in FIG. 3, the posture sensor 34A measures an angle $\beta 1$ defined by the longitudinal direction of the boom 8 (straight line connecting the centers of pivotal motion at the opposite ends) and the x-y plane and transmits the angle $\beta 1$ to the controller 44. Meanwhile, the posture sensor 34B measures an angle $\beta 2$ defined by the longitudinal direction of the boom 8 (straight line connecting the centers of pivotal motion at the opposite ends) and the longitudinal direction of the arm 9 (straight line connecting the centers of pivotal motion at the opposite ends) and transmits the angle $\beta 2$ to the controller 44. Further, the posture sensor 34C measures an angle $\beta 3$ defined by the longitudinal direction of the arm 9 (straight line connecting the centers of pivotal motion at the opposite ends) and the longitudinal direction of the bucket 10 (straight line connecting the center of pivotal motion and a claw tip) and transmits the angle $\beta 3$ to the controller 44. Here, the swing angle sensor 27 and the posture sensors 34A to 34C configure a posture sensor 60 that detects posture information of the upper swing structure 22 and the front work implement 24.

It is to be noted that, although the present embodiment described here exemplifies a case in which the swing center 38 of the front work implement 24 (connection portion of the boom 8 to the upper swing structure 22) is arranged at a position different from the swing central axis 25, the swing central axis 25 and the swing center 38 may be arranged so as to intersect with each other.

Further, although the present embodiment described here exemplifies a case in which an angle sensor or the like is used as the posture sensor 60, an inertial measurement device (IMU: Inertial Measurement Unit) may be used for the swing angle sensor 27 and the posture sensors 34A to 34C. Also such a configuration may be applied that a stroke sensor is arranged on each of the boom cylinder 5, the arm cylinder 6, and the bucket cylinder 7 such that relative orientations (posture information) at the individual connection portions of the upper swing structure 22, the boom 8, the arm 9, and the bucket 10 are calculated from stroke change amounts and the individual angles are calculated from results of the calculation.

On the upper swing structure 22, a plurality of (for example, four) external environment recognition devices 26 for detecting an object around the excavator main body (the upper swing structure 22 and the lower track structure 20) are arranged on the upper swing structure 22. The locations and the number of the external environment recognition devices 26 to be arranged are not specifically restricted to examples of present embodiment, and it is sufficient if the omnidirectional field of view of the main body (namely, the field of view of 360 degrees around the hydraulic excavator 100) can be assured. The present embodiment described here exemplifies a case in which the four external environment recognition devices 26 are arranged at an upper portion of the cab 2 and a left side portion, a right side front portion, and a right side rear portion of the upper swing structure 22 such that the field of view of 360 degrees around the main body is covered. The external environment recognition devices 26 are sensors for which, for example, the LiDAR (Laser Imaging Detection and Ranging, laser image detection and distance measurement) technique is used, and detect an object existing around the hydraulic excavator 100 (for example, an obstacle 14 hereinafter described) and transmit coordinate data of the object to the controller 44.

FIG. 3 is a functional block diagram schematically depicting part of processing functions of the controller incorporated in the hydraulic excavator. Meanwhile, FIG. 4 is a functional block diagram depicting part of the functions in FIG. 3 in detail.

Figure 4:
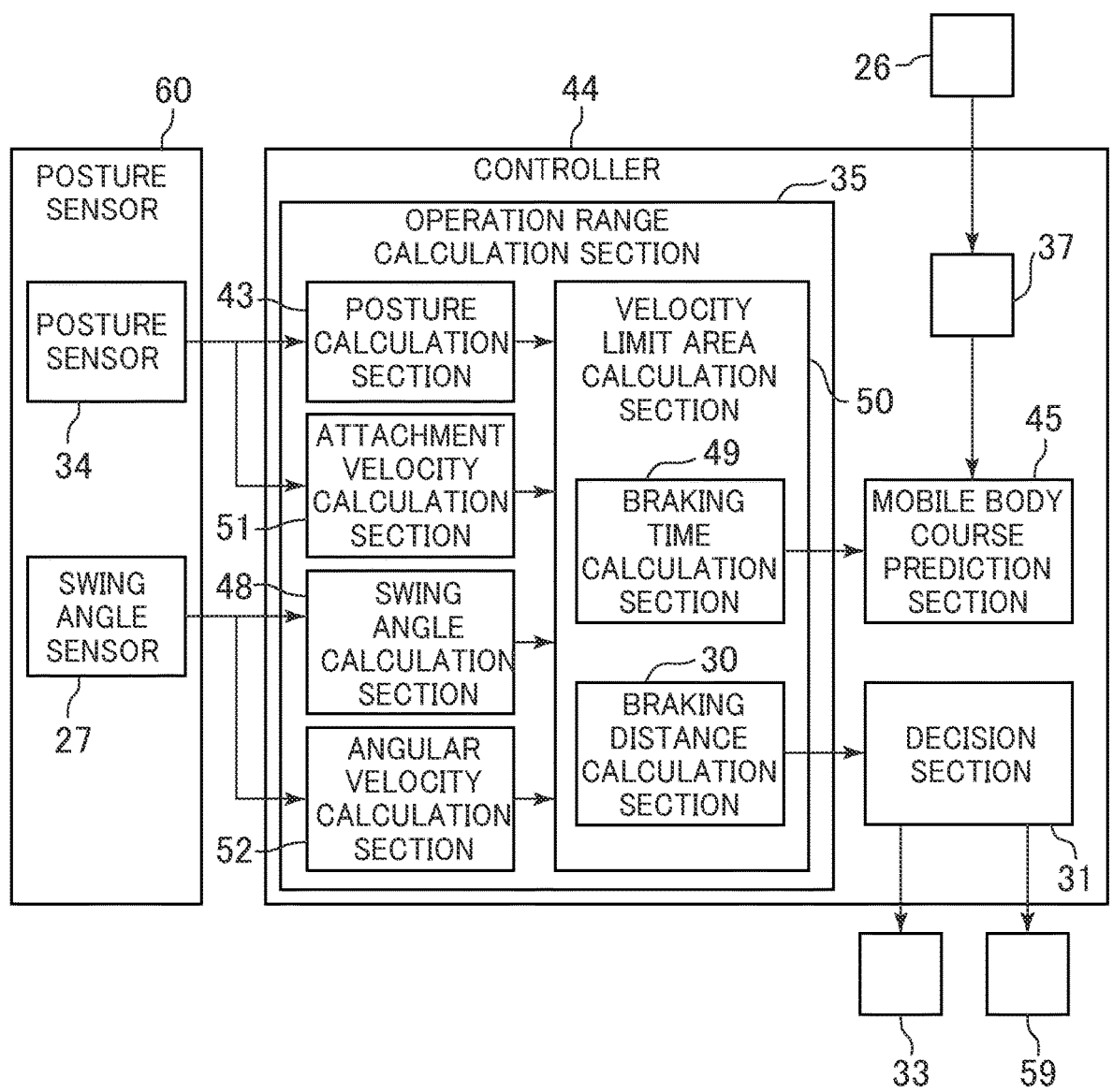
FIG. 4 is a functional block diagram depicting part of the functions in FIG. 3 in detail.
Figure 5:
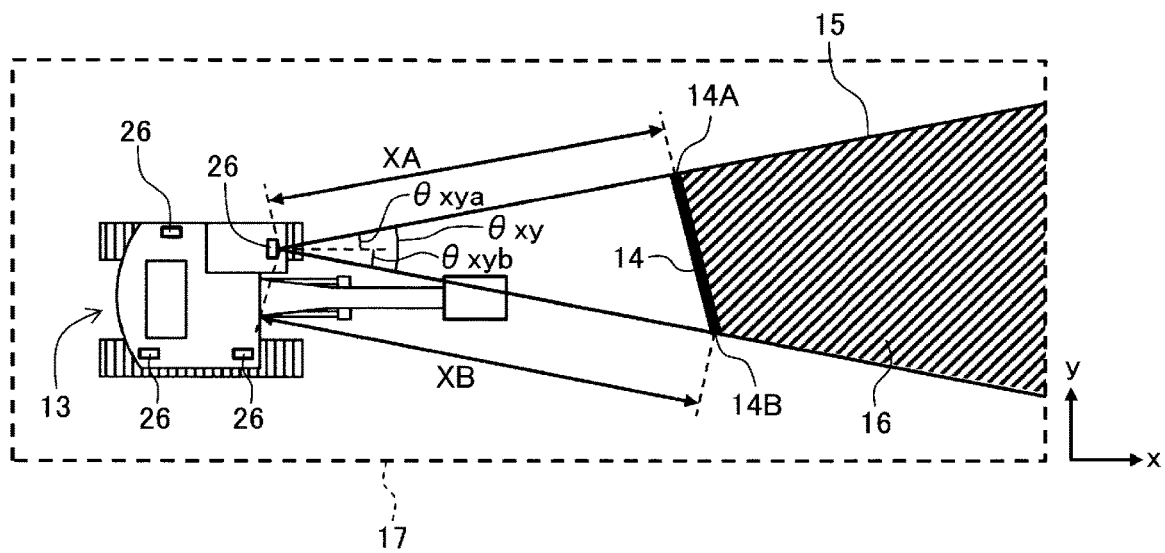
FIG. 5 is a view illustrating a dead angle calculation method on an xy plane.

Referring to FIGS. 3 and 4, the controller 44 includes a decision section 31, an operation range calculation section 35, a dead angle calculation section 37 and a moving body course prediction section 45. Meanwhile, the operation range calculation section 35 includes a posture calculation section 43, a swing angle calculation section 48, a velocity limit area calculation section 50, a front work implement velocity calculation section 51, and an angular velocity calculation section 52. Further, the velocity limit area calculation section 50 includes a braking distance calculation section 30 and a braking time calculation section 49.

Referring to FIG. 3, the dead angle calculation section 37 calculates a dead angle from a relative positional relation to the upper swing structure 22 obtained from the external environment recognition devices 26. The operation range calculation section 35 calculates a braking period of time on the basis of information obtained from the posture sensor 60, transmits the braking period of time to the moving body course prediction section 45, and transmits an operation range of the main body to the decision section 31. The calculation performed by the operation range calculation section 35 is hereinafter described in detail. The moving body course prediction section 45 decides from the obtained position and shape of a dead angle 16 whether or not there is a possibility that a moving body such as a worker may be hidden in the dead angle 16. Further, the moving body course prediction section 45 calculates an assumed movement range 41 from the obtained braking period of time, the assumed movement range 41 being a range within which the moving body may move in a period in which braking of the front work implement 24 is completed. Then, the moving body course prediction section 45 transmits the assumed movement range 41 to the decision section 31. The decision section 31 limits the velocity of a work device 33 or decides whether or not an alarm device 59 is to be operated on the basis of the information obtained by the moving body course prediction section 45 and the operation range calculation section 35. Details of the calculation of the decision section 31 are hereinafter described.

Referring to FIG. 4, the posture calculation section 43 calculates the length of the front work implement 24 on the basis of the angle information of the boom 8, the arm 9, and the bucket 10 obtained by the posture sensors 34 and transmits the length of the front work implement 24 to the velocity limit area calculation section 50. Further, the front work implement velocity calculation section 51 calculates the velocity at which the front work implement 24 is to move (front work implement velocity), on the basis of fluctuations of the angles of the boom 8, the arm 9, and the bucket 10 obtained by the posture sensors 34 and transmits the velocity to the velocity limit area calculation section 50. Further, the swing angle calculation section 48 calculates a turning angle of an own vehicle 13 where the forward direction of the lower track structure 20 is determined as 0 degrees and the left turn direction of the upper swing structure 22 is determined as positive, and transmits the turning angle to the velocity limit area calculation section 50. Further, the angular velocity calculation section 52 calculates the angular velocity of the front work implement 24, on the basis of the changing velocity of the swing angle inputted from the swing angle sensor 27 and transmits the angular velocity to the velocity limit area calculation section 50. The velocity limit area calculation section 50 is configured from the braking distance calculation section 30 and the braking time calculation section 49. The braking distance calculation section 30 calculates a braking distance of the front work implement 24 from the front work implement length obtained by the posture calculation section 43, the moving velocity of the front work implement 24 obtained by the front work implement velocity calculation section 51, the swing angle obtained by the swing angle calculation section 48, and the angular velocity obtained from the angular velocity calculation section 52, and transmits the braking distance to the decision section 31. Further, the braking time calculation section 49 calculates a braking period of time of the front work implement 24 from the front work implement length obtained by the posture calculation section 43, the moving velocity of the front work implement 24 obtained by the front work implement velocity calculation section 51, the swing angle obtained by the swing angle calculation section 48, and the angular velocity obtained by the angular velocity calculation section 52, and transmits the braking period of time to the moving body course prediction section 45.

The controller 44 configured in such a manner as described above calculates a dead angle area (dead angle 16) that is a range that becomes a dead angle by an object recognized by the external environment recognition devices 26 from the recognition range of the external environment recognition device and calculates an assumed movement range 41 that is a range in which a moving body 39 assumed to exist in the dead angle is movable in a period of time determined in advance. Further, the controller 44 calculates a movable range that is a range in which the front work implement 24 is movable in a period of time determined in advance, on the basis of the posture information detected by the posture sensor 60 and performs preventive control for preventing contact between the moving body 39 and the front work implement 24, on the basis of the assumed movement range 41 of the moving body 39 and the movable range of the front work implement 24.

Figure 13:
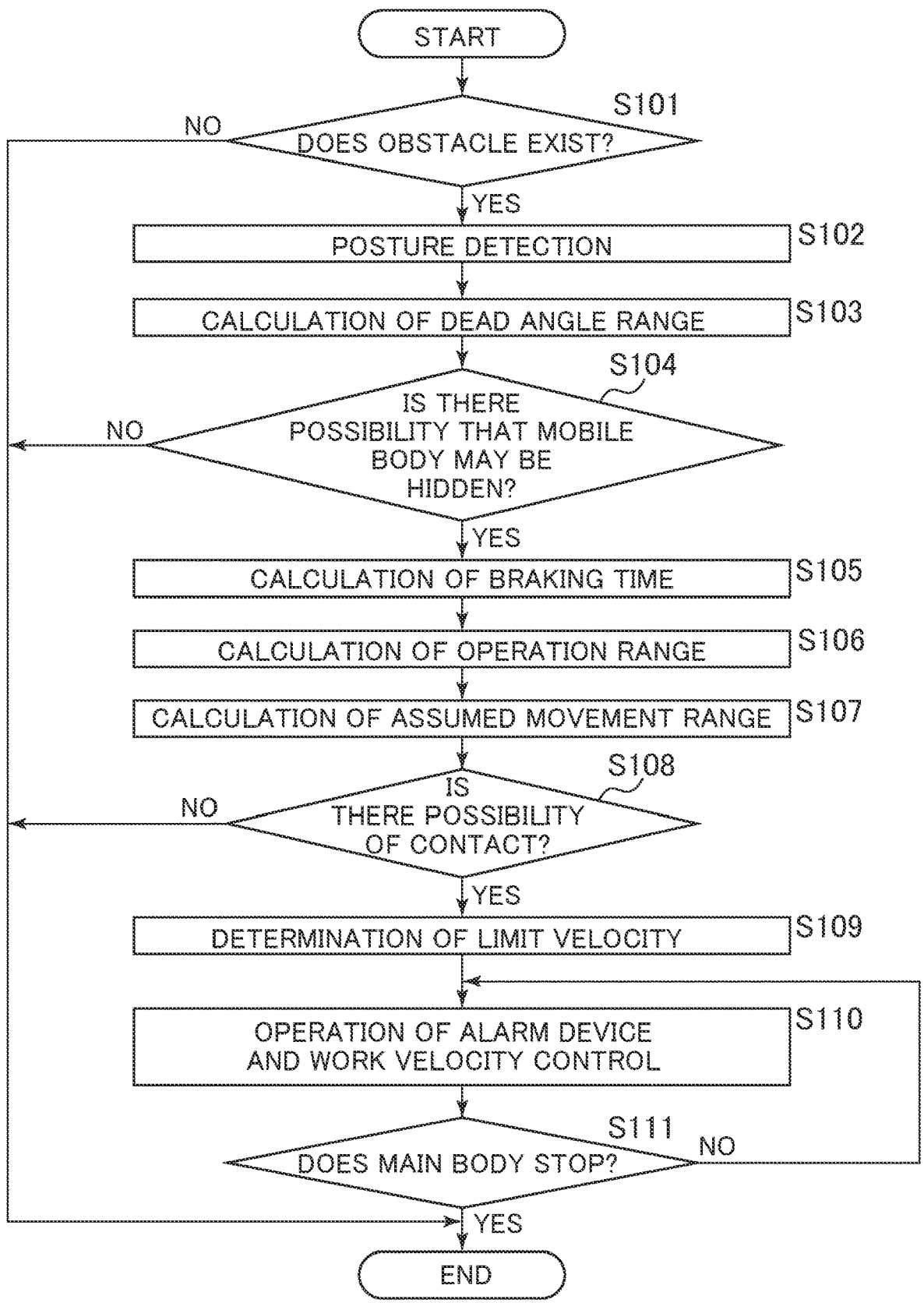
FIG. 13 is a flow chart depicting contents of processing of preventive control.

FIG. 13 is a flow chart depicting the contents of processing for prevention control.

Referring to FIG. 13, the controller 44 first decides whether or not there is present an obstacle (step S101). When the decision result is YES, the controller 44 detects the posture of the hydraulic excavator main body (step S102) and performs dead angle range calculation of calculating a dead angle caused by the obstacle (step S103).

Then, the controller 44 decides whether or not there is a possibility that a moving body may be hidden in the dead angle (step S104). When the decision result is YES, the controller 44 performs braking time calculation of calculating braking time of the front work implement 24 (step S105), performs a motion range calculation process of calculating a motion range of the front work implement 24 (step S106), and performs assumed movement range calculation of calculating a relative movement range of the moving body (step S107).

Then, the controller 44 decides whether or not there is a possibility that the moving body and the front work implement 24 may contact with each other (step S108). When the decision result is YES, the controller 44 determines a limit velocity relating to the driving of the front work implement 24 (step S109), and performs activation of the alarm device 59 and control operation of the working velocity (step S110).

Then, the controller 44 decides whether or not the main body is stopped (step S111), and when the decision result is NO, the process at step S110 is repeated until the decision result becomes YES. On the other hand, when the decision result at S111 is YES, the controller 44 ends the processing.

Further, when the decision result at any of steps S101, S104 and S108 is NO, the processing is ended.

Such preventive control as described above is described in more detail.

First, a calculation method of a front work implement length R and a bucket height Zb depicted in FIG. 2 is described. The front work implement length R is a distance R from the swing central axis 25 to the distal end of the front work implement 24. The lengths of the boom 8, the arm 9, and the bucket 10 are represented by L1, L2, and L3, respectively. The angle β1 defined by the x-y plane and the longitudinal direction of the boom 8 is measured by the posture sensor 34A. The angle β2 defined by the boom 8 and the arm 9 and the angle β3 defined by the arm 9 and the bucket 10 are measured by the posture sensors 34B and 34C, respectively. The height Z0 from the x-y plane to the swing center 38 is obtained in advance. Also the distance L0 from the swing central axis 25 to the swing center 38 is obtained in advance.

An angle β2a defined by the xy plane and the longitudinal direction of the arm 9 can be calculated from the angle β1 and the angle β2. An angle β3b defined by the xy plane and the longitudinal direction of the bucket 10 can be calculated from the angle β1, and the angles β2 and β3. The bucket height Zb and the front work implement length R can be calculated by the following (expression 1) and (expression 2), respectively.

$$Zb = Z0 + L1 \sin\beta1 + L2 \sin\beta2 + L3 \sin\beta3: \quad \text{(expression 1)}$$

$$R = L0 + L1 \cos\beta1 + L2 \cos\beta2 + L3 \cos\beta3: \quad \text{(expression 2)}$$

Now, a calculation method of the dead angle 16 performed by the controller 44 of the first working example according to the present invention is described with reference to FIGS. 5 to 11. First, a dead angle calculation method on the xy plane is described with reference to FIG. 5. On the basis of the coordinates of the obstacle 14 obtained by the external environment recognition devices 26, relative angles θxya and θxyb and relative distances XA and XB between the own vehicle 13 on the xy plane and the opposite left and right end portions 14A and 14B of the obstacle 14 are calculated by an obstacle position calculation section 36 in the controller 44. On the basis of these pieces of information, the dead angle calculation section 37 calculates whether or not a dead angle 16 arising from the obstacle 14 exists. In this case, the dead angle 16 points to a range indicated by slanting lines, and when the front face side of the detected obstacle 14 is determined as the forward direction, the dead angle calculation section 37 recognizes a region behind the position at which the obstacle 14 is detected as the dead angle 16. In particular, when the distances from the external environment recognition devices 26 to the opposite left and right end portions 14A and 14B of the obstacle 14 are represented by XA and XB, respectively, the dead angle calculation section 37 recognizes the rear of a range of the angle θxy defined by the distances XA and XB from the external environment recognition devices 26 to the end portions of the obstacle 14 as the dead angle 16. It is to be noted that, when the size of the dead angle 16 is smaller than a general moving body (worker) 39, the dead angle calculation section 37 may determine that there is no dead angle 16. This can avoid excessive intervention for control.

Now, a dead angle detection method on the xy plane is described with reference to FIGS. 6 to 8.

Figure 6:
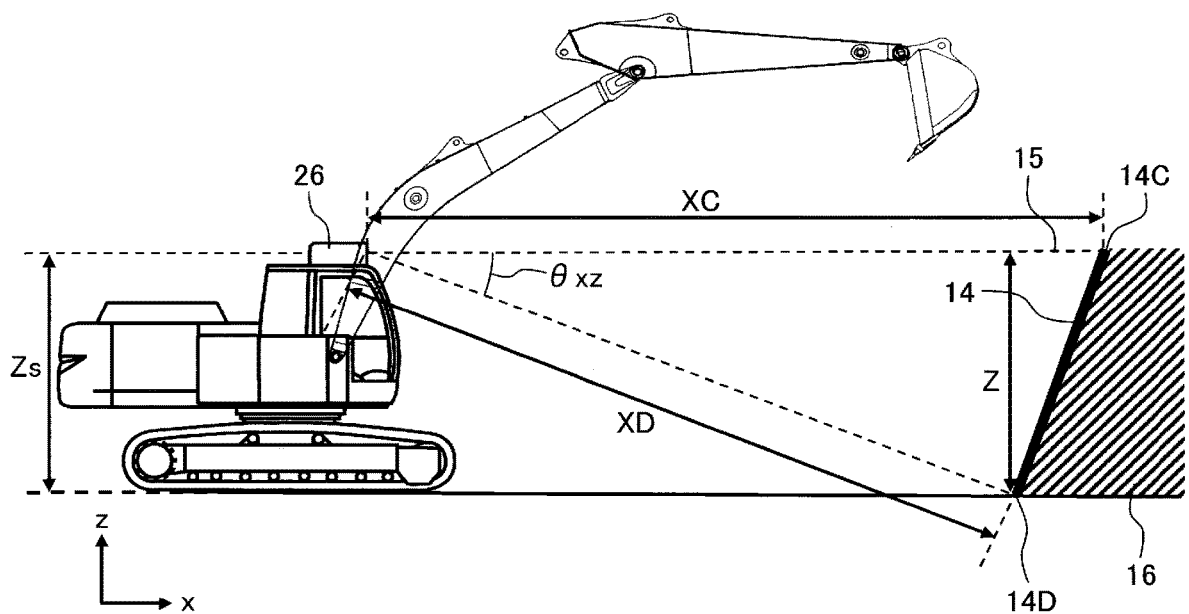
FIG. 6 is a view illustrating another dead angle calculation method on the xy plane.

When the height Z of the detected obstacle 14 is equal to the height Zs at which the external environment recognition device 26 is arranged as depicted in FIG. 6, the height of the dead angle 16 is defined as the height Z. The rear of a range of the angle θxz defined by the distances XC and XD from the external environment recognition device 26 to the upper and lower end portions 14C and 14D of the obstacle 14 is recognized as the dead angle 16.

Figure 7:
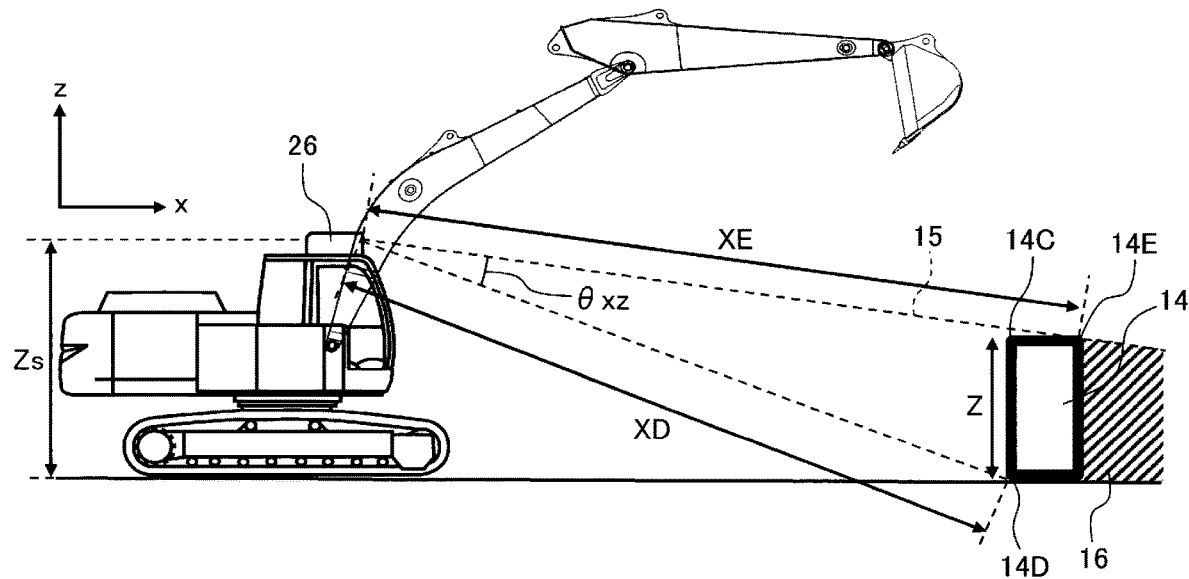
FIG. 7 is a view illustrating a further dead angle calculation method on the xy plane.

On the other hand, when the height Z of the obstacle 14 is lower than the height Zs at which the external environment recognition device 26 is arranged as depicted in FIG. 7, the depth of the obstacle 14 can be calculated on the basis of end portions 14C, 14D, and 14E of the obstacle 14. Here, since the opposite ends of the obstacle 14 are given by 14D and 14E, the dead angle 16 has an angle given by the distances XD and XE to the end portions 14D and 14E of the obstacle 14. Since, by arranging the external environment recognition device 26 at a position higher than the obstacle 14, it is possible to detect the depth of the obstacle 14, it is desirable to arrange the external environment recognition devices 26 at a position as high as possible. In addition, also when it is difficult to arrange the external environment recognition devices 26 at a high position, where the height of the detected height Z is not a height at which the moving body (worker) 39 can be hidden, the control may not be carried out.

Figure 8:
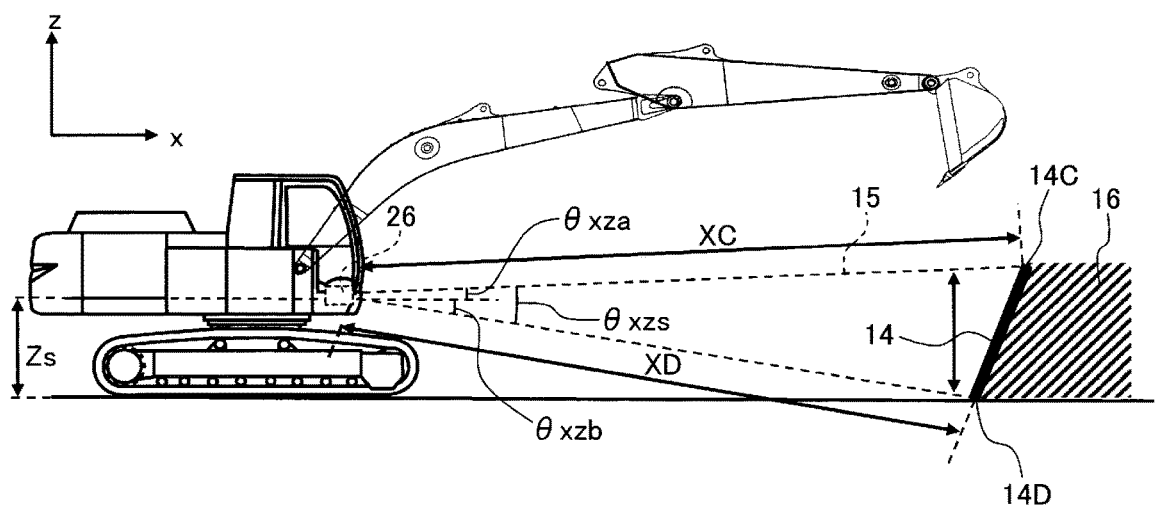
FIG. 8 is a view illustrating a still further dead angle calculation method on the xy plane.

On the other hand, when the height Z of the detected obstacle 14 is higher than the height Zs at which the external environment recognition device 26 is arranged as depicted in FIG. 8, within a range of an angle θxzs that is the sum of θxza and δxzb where θxza is an angle between the upper end portion 14C of the obstacle 14 and the height Zs of the external environment recognition devices 26 and δxzb is an angle between the lower end portion 14D of the obstacle 14 and the height Zs of the external environment recognition devices 26, a region behind the obstacle 14 is recognized as the dead angle 16.

Now, a case in which the bucket 10 of the own vehicle 13 becomes a dead angle 16 is described with reference to FIGS. 9 to 11.

Figure 9:
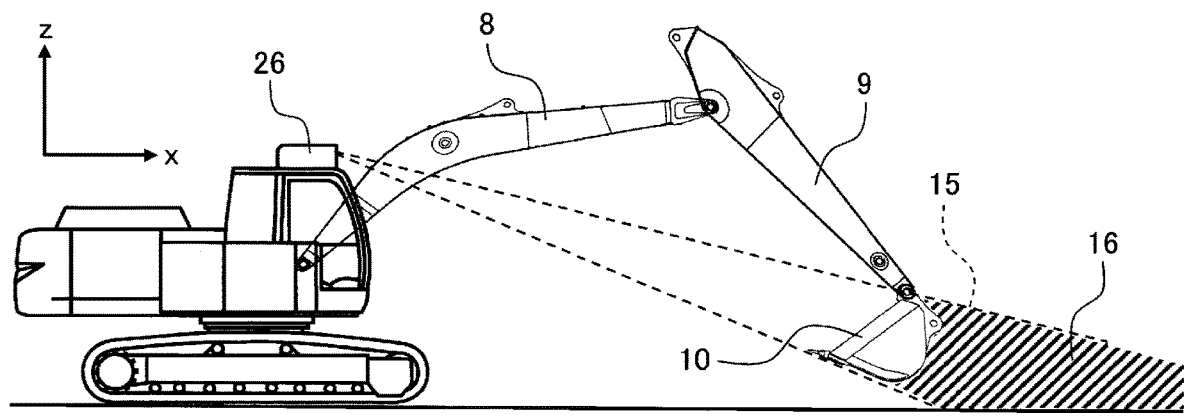
FIG. 9 is a view illustrating a case in which a bucket of an own vehicle becomes a dead angle.

As depicted in FIG. 9, depending upon the arrangement place of the external environment recognition device 26, there may occur a case in which the bucket 10 of the own vehicle 13 becomes a dead angle 16. As depicted in FIG. 9, depending upon the posture of the hydraulic excavator 100, the bucket 10 obstructs the visual field of the external environment recognition device 26 and forms a dead angle 16. In this case, where the external environment recognition device 26 can partly recognize the obstacle 14 through the bucket 10, the bucket 10 is not decided as a dead angle 16.

Figure 10:
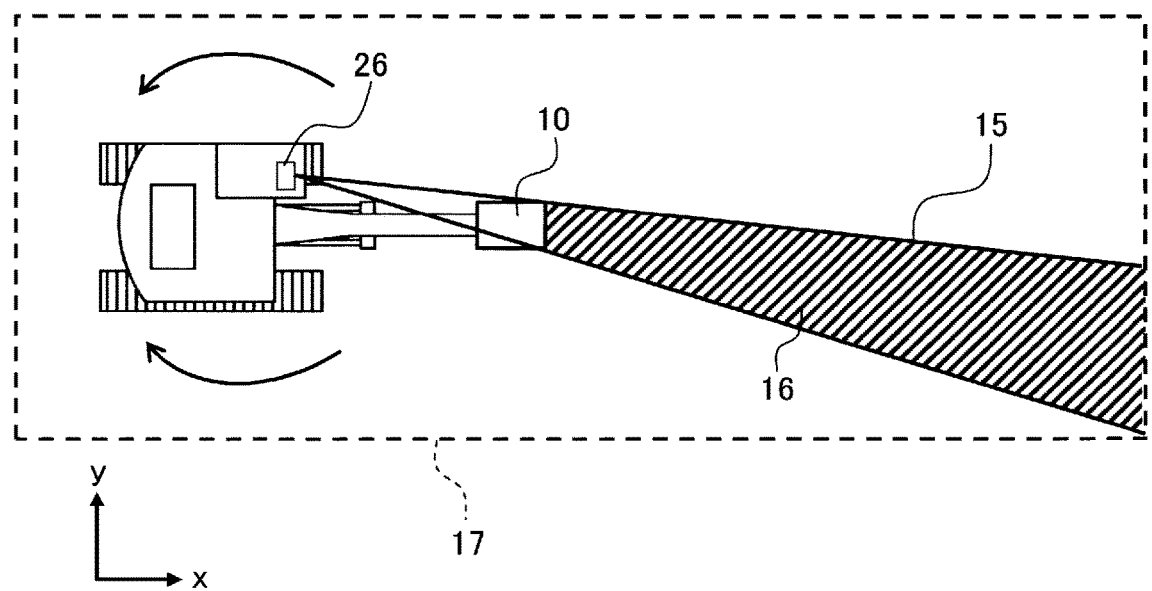
FIG. 10 is a view illustrating the case in which the bucket of the own vehicle becomes a dead angle.
Figure 11:
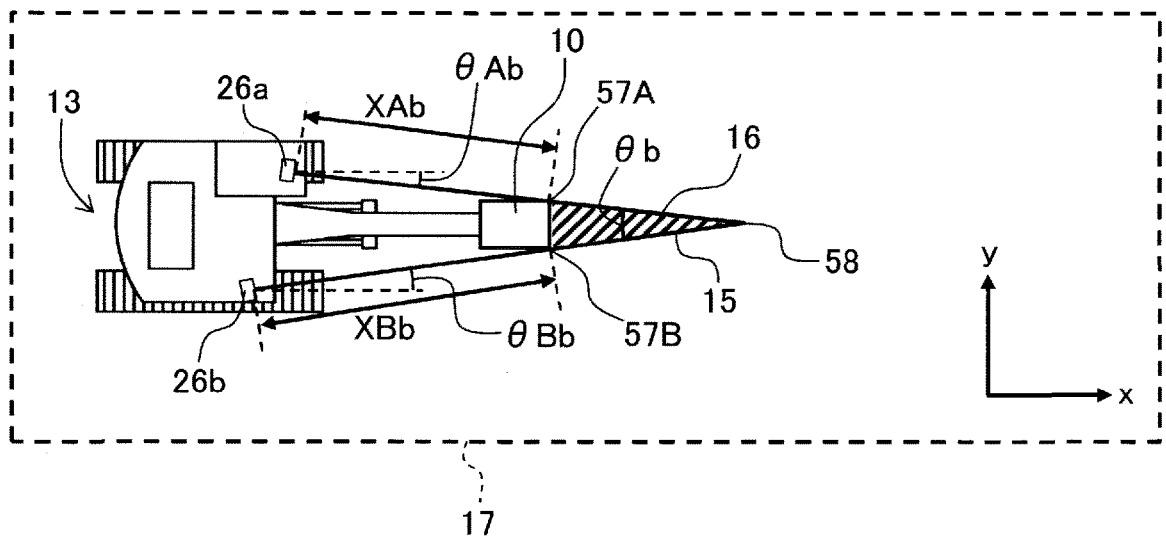
FIG. 11 is a view illustrating another case in which the bucket of the own vehicle becomes a dead angle.

Moreover, as depicted in FIG. 10, when the external environment recognition device 26 is arranged at an upper portion of the cab 2, a dead angle 16 is formed also on the xy plane. Therefore, for example, by arranging an external environment recognition device 26 on the upper swing structure 22 on the opposite side to the front work implement 24 as viewed from the cab 2 side, the range of the dead angle 16 can be narrowed as depicted in FIG. 11 In this case, the dead angle 16 is recognized as a dead angle in a range of an angle θb from a dead angle line cross over point 58, which is a point at which both dead angle lines 15 of the external environment recognition devices 26a and 26b cross with each other, to the distance of the distal end portions 57A and 57B of the bucket. Here, the angle θb is the sum of θAb and θBb.

Now, a calculation method of a velocity limit area 40, a position at which the moving body (worker) 39 may exist, a calculation technique of the assumed movement range 41, how to cope with a dead angle by the bucket 10 and a control method of the work device 33 are described with reference to FIG. 12.

Figure 12:
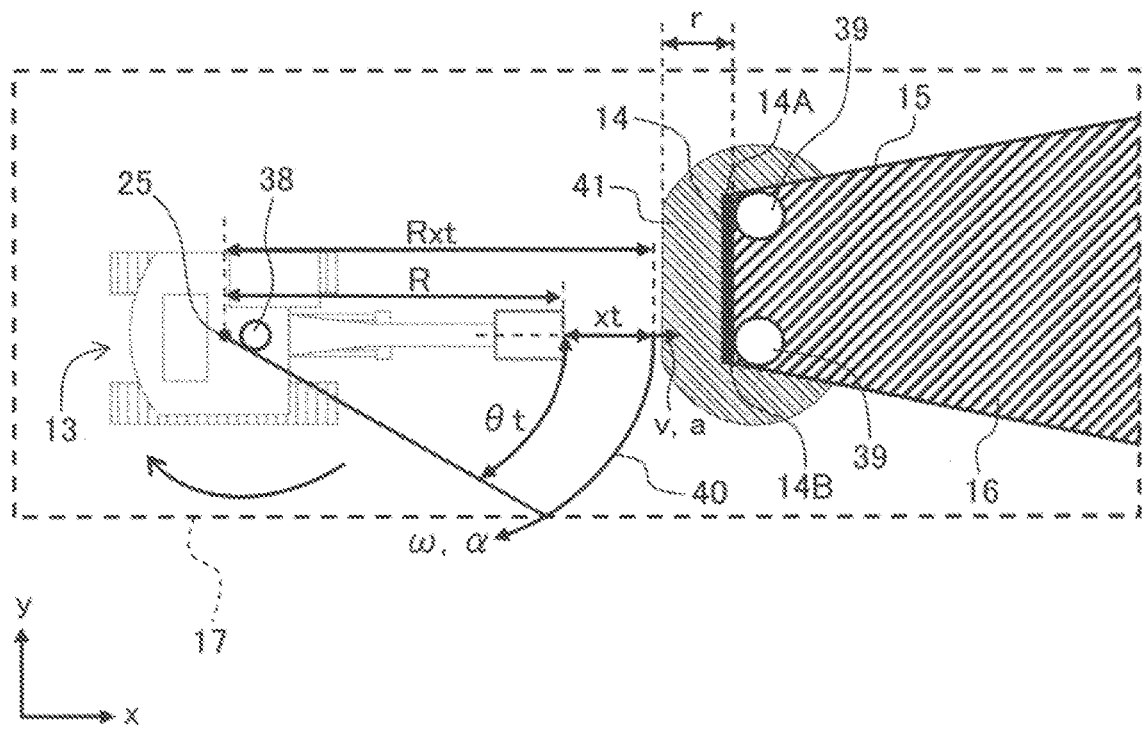
FIG. 12 is a view illustrating a calculation technique of a velocity limit area and an assumed movement range.

It is assumed that the angular velocity of the front work implement 24 at the current point of time is co and the front work implement length is R as depicted in FIG. 12. In this case, the angle θt (braking angle) over which the front work implement 24 swings after a point of time at which the brake for stopping the swing is operated until the front work implement 24 stops can be calculated, from tθ (swing braking time) that represents a period of time required until the front work implement 24 is braked where maximum braking force is applied, α that represents a swing acceleration, and θt0 that represents an initial angle, according to the following (expression 3).

$$\theta t = \theta t0 + \omega \times t\theta + (\alpha \times t\theta^2)/2: \quad \text{(expression 3)}$$

Further, the distance xt (forward braking distance) over which the front work implement 24 stops after a point of time at which the brake for stopping the movement in the forward direction is rendered operative can be calculated from the forward velocity v, tx representing a period of time (forward-rearward braking time period) from a point of time at which the brake for stopping the movement in the forward or rearward direction is operated to a point of time at which the front work implement 24 stops and a representing a deceleration acceleration according to the following (expression 4).

$$xt = v \times tx + (a \times tx^2)/2: \quad \text{(expression 4)}$$

Therefore, when the forward braking distance is represented by xt, the length of the front work implement is represented by R, and the value of the sum of the distance L0 from the swing central axis 25 to the swing center 38 is represented by Rxt, the velocity limit area 40 is set to a range over which the radius of this Rxt is swung by θt. Further, the velocity limit area 40 when the front work implement 24 moves rearwardly is set to a range over which the radius given by the front work implement length R is swung by θt.

Now, a calculation method of the assumed movement range 41 of the moving body (worker) 39 is described. It is assumed that the moving body (worker) 39 existing in the dead angle 16 exists at a position at which it contacts with a surface line 42 interconnecting the opposite left and right end portions 14A and 14B of the obstacle 14 and both of the dead angle lines 15. In this case, the assumed movement range 41 of the moving body (worker) 39 depends upon the walking time period of the moving body (worker) 39 and the distance r over which the moving body (worker) 39 may move. The walking time period of the moving body (worker) 39 is selectively set to a value of a longer period of time among periods of time taken until the front work implement 24 is braked in the forward or rearward direction and in the swinging direction. Meanwhile, the distance r over which the moving body (worker) 39 may move is defined as a distance over which, when the walking speed of the moving body (worker) 39 is an average walking speed of an adult, the moving body (worker) 39 walks for a period of time taken for the movement. Therefore, the assumed movement range 41 is a range in which the distance r over which the worker may move is rotated by 360 degrees from the surface of the moving body (worker) 39.

Further, a countermeasure against a dead angle by the bucket 10 is described. If a dead angle 16 is formed by the bucket 10, it is possible to complement a dead angle range using information before formation of a dead angle obtained by the external environment recognition devices 26 thereby to suppress application of excessive control.

The decision section 31 decides whether or not the assumed movement range 41 calculated by the moving body course prediction section 45 and the velocity limit area 40 calculated by the operation range calculation section 35 overlap with each other. When the assumed movement range 41 and the velocity limit area 40 calculated by the operation range calculation section 35 seem to overlap with each other, the decision section 31 transmits velocity limit to the work device 33 or operates the alarm device 59. By providing such a decision section 31 as described, a contact probability with a moving body appearing from the dead angle 16 can be reduced. Further, it is also possible to provide a margin to the velocity limit area 40 such that, when the assumed movement range 41 overlaps with the margin, the alarm device 59 is operated and, when the velocity limit area 40 and the assumed movement range 41 seem to overlap with each other, velocity limit is applied to the work device 33.

Advantageous effects of the present embodiment configured in such a manner as described above are described.

In construction machines such as hydraulic excavators in the construction civil engineering industry, as measures for preventing contact of a front work implement which performs work, with a worker, a technique is available by which the working velocity of the front work implement is limited. However, in the conventional technique described above, since this does not take it into consideration that a possibility that a moving body may exist in the dead angle of a detected object, when a moving body appears from the dead angle, the conventional technique cannot deal with this sufficiently.

In contrast, in the present embodiment, a construction machine that includes a main body configured from a lower track structure and an upper swing structure provided swingably with respect to the lower track structure, a front work implement of articulated type attached to the main body and configured from a plurality of front members pivotably connected to each other, and a plurality of actuators that individually drive the plurality of front members of the front work implement, includes a posture sensor that is provided on each of the front members of the front work implement and detects posture information of the front member, an external environment recognition device that detects an object around the main body, and a controller that calculates a dead angle range that is a range that becomes a dead angle from a recognition range of the external environment recognition device, the dead angle arising from an object recognized by the external environment recognition device, that calculates an assumed movement range that is a range within which a moving body assumed to exist in the dead angle is movable in a period of time determined in advance, that calculates a movable range that is a range within which the front work implement is movable in a period of time determined in advance on the basis of the posture information detected by the posture sensor, and that performs preventive control for preventing contact between the moving body and the front work implement on the basis of the assumed movement range of the moving body and the movable range of the front work implement. Therefore, the construction machine can deal also with a moving body in a dead angle of an object and can prevent contact between the front work implement and a moving body with a higher degree of certainty.

Second Embodiment

A second embodiment of the present invention is described with reference to FIGS. 14 and 15.

In the first embodiment, the external environment recognition devices 26 is used to calculate a dead angle 16 from a relative distance to and a relative angle with respect to an obstacle 14. However, in the present embodiment, the hydraulic excavator includes a position measurement device 46 that measures the position of an own vehicle 13 on the basis of, for example, GPS signals and a wireless communication device 47 that receives information of the position of the obstacle 14 detected by another vehicle 18, the position of the other vehicle 18 and the orientation of the main body. The wireless communication device 47 transmits the information obtained from the other vehicle 18 to the dead angle calculation section 37, and the dead angle calculation section 37 calculates, on the basis of information of the external environment recognition devices 26, the position measurement device 46, and the wireless communication device 47, a dead angle 16, a position at which a moving body may exist, and an assumed movement range 41 of a moving body (worker) 39.

Figure 14:
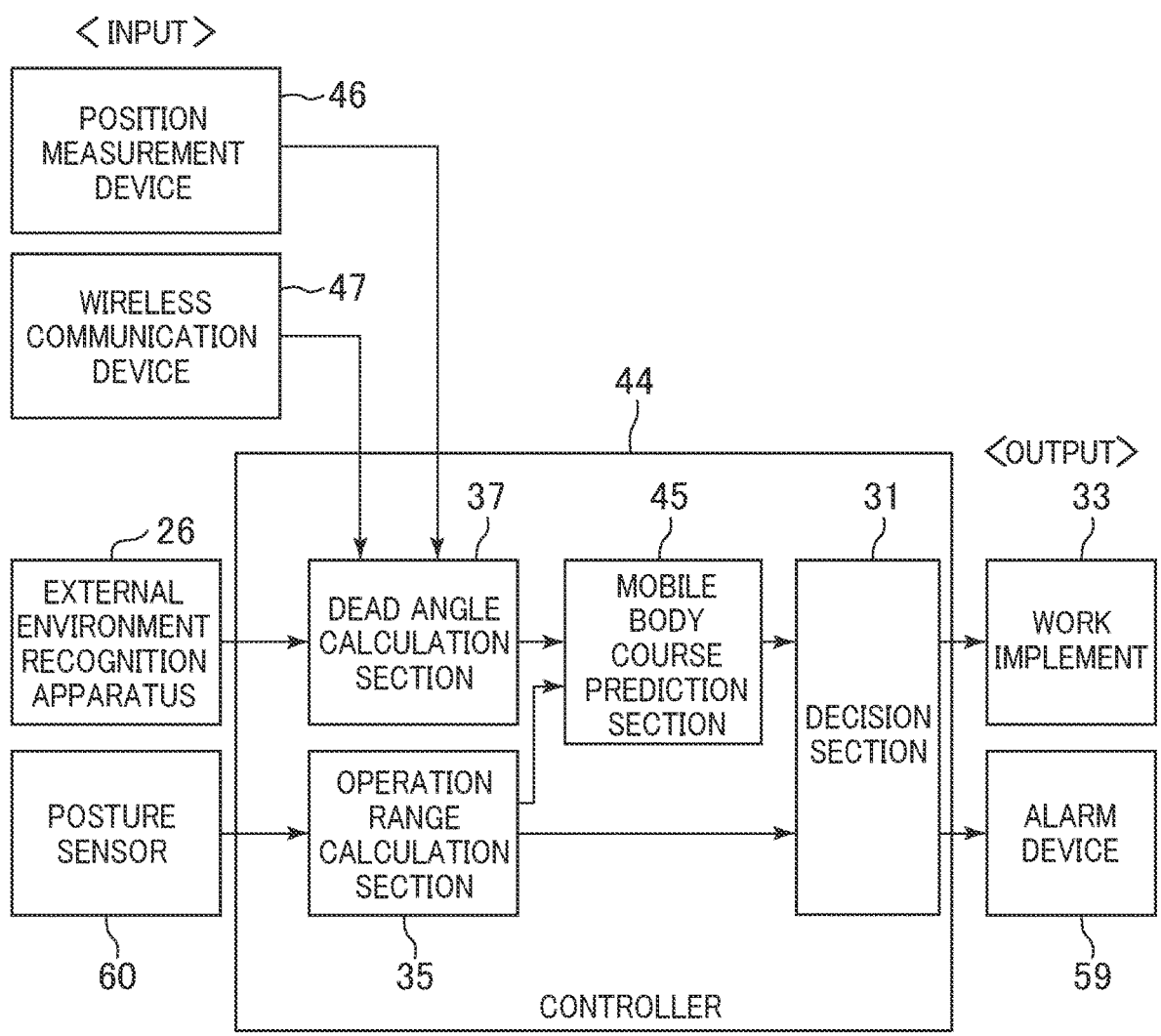
FIG. 14 is a functional block diagram schematically depicting part of processing functions of a controller incorporated in a hydraulic excavator according to a second embodiment.

FIG. 14 is a functional block diagram schematically depicting part of processing functions of a controller incorporated in a hydraulic excavator according to the present embodiment. Meanwhile, FIG. 15 is a view illustrating calculation of a dead angle in the present embodiment. In FIG. 14, like members to those in the first embodiment are denoted by like reference numerals, and description of them is omitted.

As depicted in FIG. 14, the position measurement device 46 transmits a coordinate position of the own vehicle 13 to the dead angle calculation section 37, for example, on the basis of GPS signals. Further, the wireless communication device 47 receives information of the external environment recognition devices 26 obtained by the other vehicle 18, the coordinate position of the other vehicle 18, and the orientation of the main body of the other vehicle 18 and transmits them to the dead angle calculation section 37. The dead angle calculation section 37 calculates the dead angle 16 on the basis of the information of the position measurement device 46, the wireless communication device 47, and the external environment recognition devices 26 of the own vehicle 13 and transmits the dead angle 16 to the moving body course prediction section 45.

Figure 15:
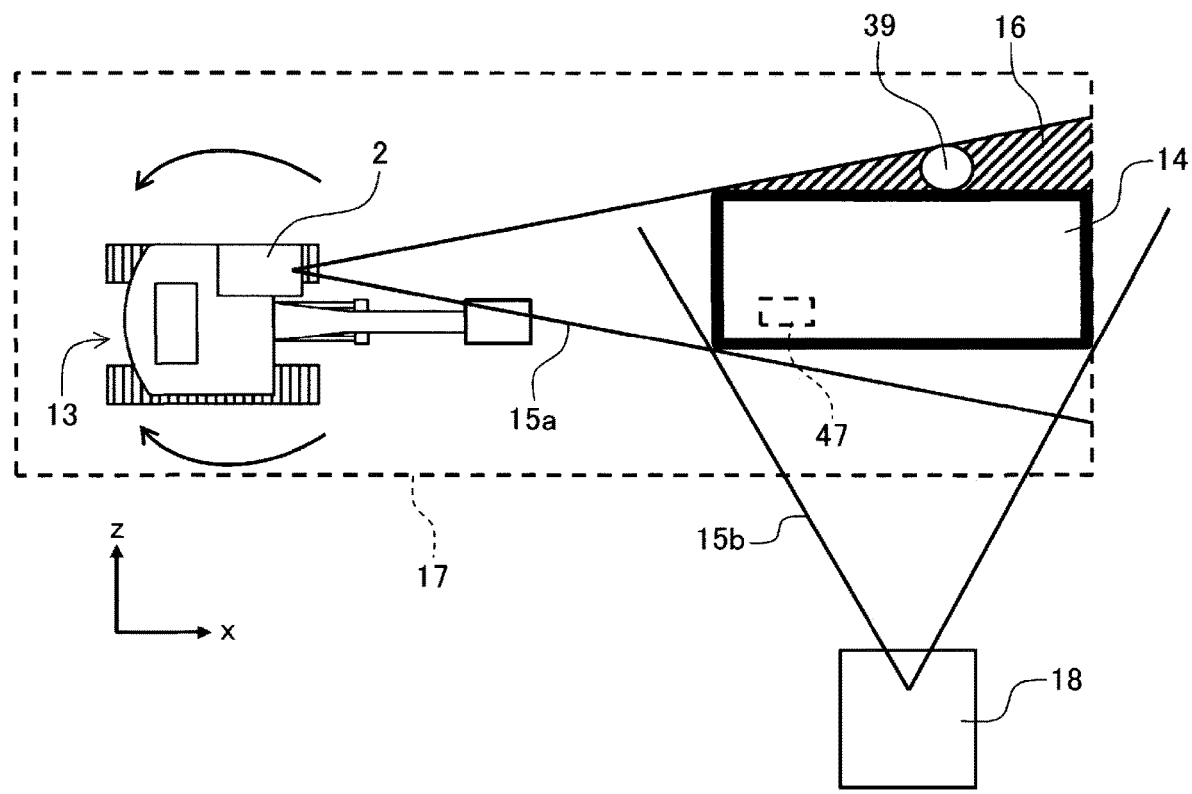
FIG. 15 is a view illustrating calculation of a dead angle in the second embodiment.

As depicted in FIG. 15, for example, when the other vehicle 18 exists at a position at which it can detect a side portion of the obstacle 14 from the inside or the outside of a working range 17, the other vehicle 18 transmits the coordinate position of the vehicle and the orientation of the main body of the vehicle through the wireless communication device 47. The own vehicle 13 receives the information obtained by the other vehicle 18 through the wireless communication device 47, and the dead angle calculation section 37 calculates a positional relation with the own vehicle 13 from the coordinate positions of the own vehicle 13 and the other vehicle 18. Further, the dead angle calculation section 37 calculates the position of the obstacle 14 detected by the other vehicle 18 and the dead angle 16 from the orientation of the main body of the other vehicle 18. Here, the dead angle 16 of the obstacle 14 detected by the own vehicle 13 is represented by a range of dead angle lines 15a, and the dead angle 16 of the obstacle 14 detected by the other vehicle 18 is represented by a range of dead angle lines 15b.

Further, the dead angle calculation section 37 compares the dead angle 16 calculated on the basis of the information obtained by the own vehicle 13 with the dead angle 16 calculated on the basis of the information of the other vehicle 18. If the range decided as the dead angle 16 by the own vehicle 13 has been able to be detected by the other vehicle 18, then the dead angle calculation section 37 does not recognize the range as the dead angle 16. As a result, for working and a swing motion to a direction detected by the other vehicle 18, the necessity to carry out velocity limit is eliminated.

The configuration of the other part is similar to that in the first embodiment.

In this manner, also in the present embodiment, advantageous effects similar to those in the first embodiment can be achieved.

Third Embodiment

A third embodiment of the present invention is described with reference to FIGS. 16 to 18.

In the second embodiment, the external environment recognition devices 26 uses the technique for obtaining coordinate data of the LiDAR or the like to obtain a relative distance and a relative angle with respect to the obstacle 14, and further calculates the dead angle 16 from the position measurement device 46 that measures the position of the own vehicle 13 and the position information of the other vehicle 18 obtained from the wireless communication device 47 and the relative distance and the relative angle to the obstacle 14. However, in the present embodiment, the hydraulic excavator includes a position estimation device that measures the position of the own vehicle 13, an image discrimination device 53 that captures an image of the object 14 using a camera or the like, a wireless communication device 47 that receives information from the other vehicle 18 through wireless communication, an external environment recognition devices 26 that transmits the relative distance and the relative angle with respect to the obstacle 14 to the obstacle discrimination device 54, and the obstacle discrimination device 54 that discriminates the obstacle 14 on the basis of these pieces of information, and the obstacle discrimination device 54 additionally incorporates a function for recognizing the obstacle 14 as the other vehicle 18 on the basis of these pieces of information and deciding a vehicle model.

Figure 16:
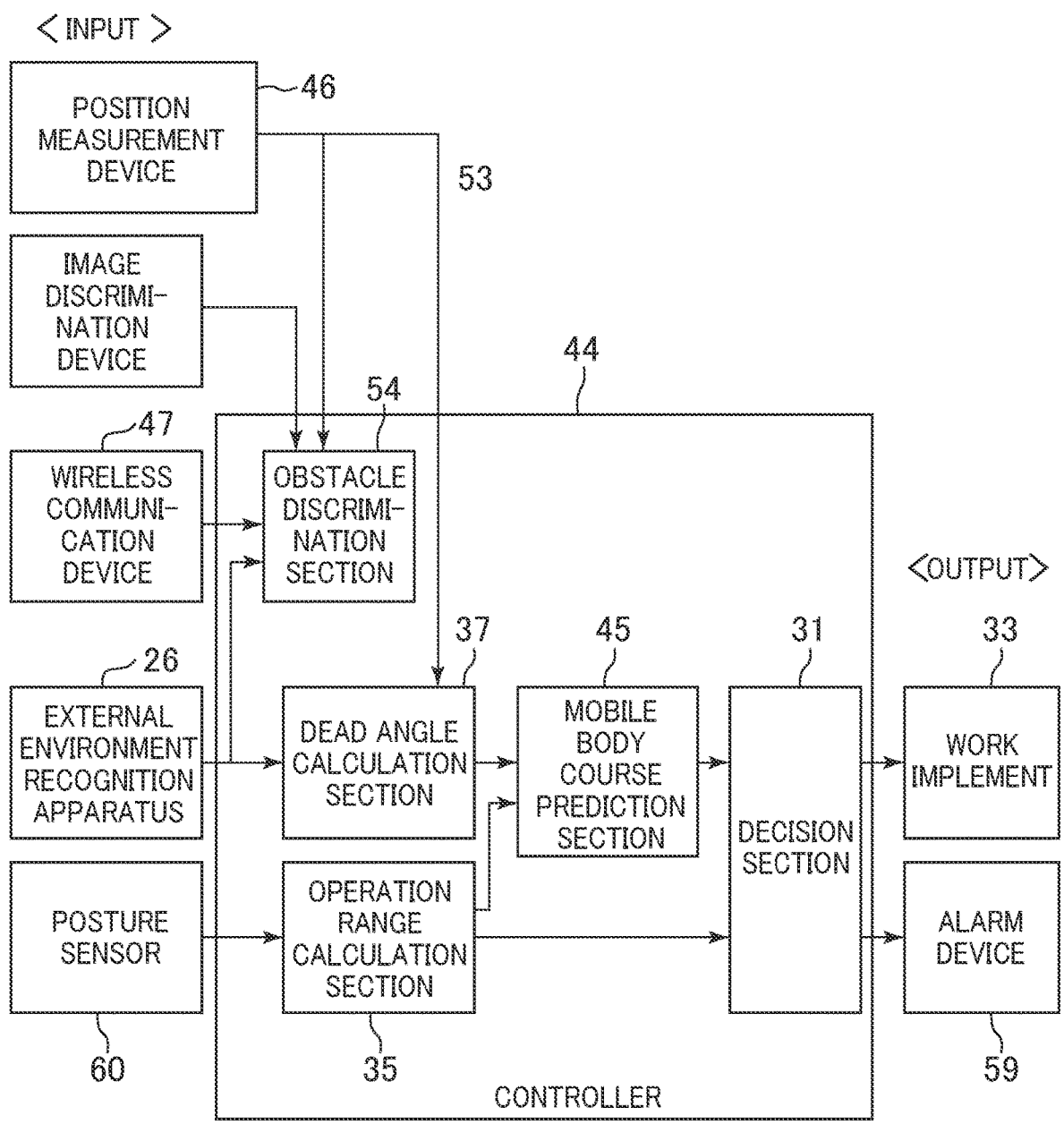
FIG. 16 is a functional block diagram schematically depicting part of processing functions of a controller incorporated in a hydraulic excavator according to a third embodiment.

FIG. 16 is a functional block diagram schematically depicting part of processing functions of a controller incorporated in a hydraulic excavator in the present embodiment. Further, FIG. 17 is a view illustrating calculation of a dead angle in the present embodiment, and FIG. 18 is a view illustrating an assumed movement range of a moving body in the present embodiment. In the figures, like members to those in the first and second embodiments are denoted by like reference characters, and description of them is omitted.

As depicted in FIG. 16, the position measurement device 46 transmits the coordinate of the own vehicle 13 to the obstacle discrimination device 54. Further, the image discrimination device 53 captures an image of the obstacle 14 and transmits the image to the obstacle discrimination device 54. The wireless communication device 47 transmits position information and vehicle model information of the other vehicle 18 in which the position measurement device 46 is incorporated, to the obstacle discrimination device 54. The obstacle discrimination device 54 compares the image acquired from the image discrimination device 53 with images of construction machines stored in advance therein to discriminate whether or not the obstacle 14 is the other vehicle 18. Further, the obstacle discrimination device 54 calculates a positional relation between the own vehicle 13 and the other vehicle 18 from the position of the own vehicle 13 obtained from the position measurement device 46 and the position information of the other vehicle 18 obtained from the wireless communication device 47. Then, when the position of the obstacle 14 obtained from the external environment recognition devices 26 coincides with the calculated position of the other vehicle 18, the obstacle discrimination device 54 recognizes that the obstacle 14 is the other vehicle 18.

Figure 17:
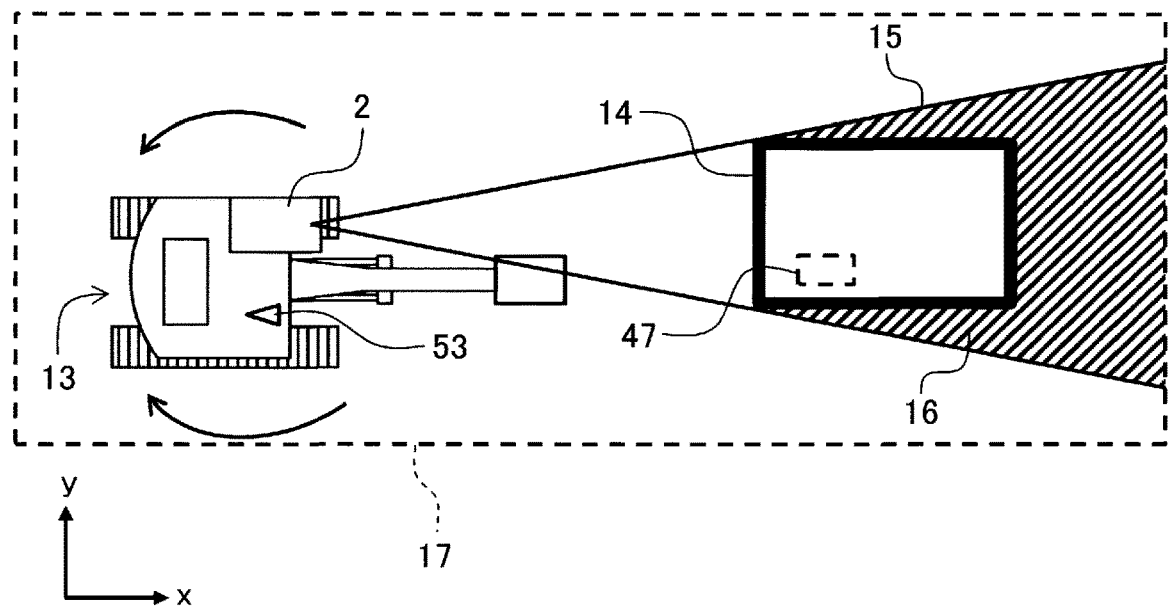
FIG. 17 is a view illustrating calculation of a dead angle in the third embodiment.
Figure 18:
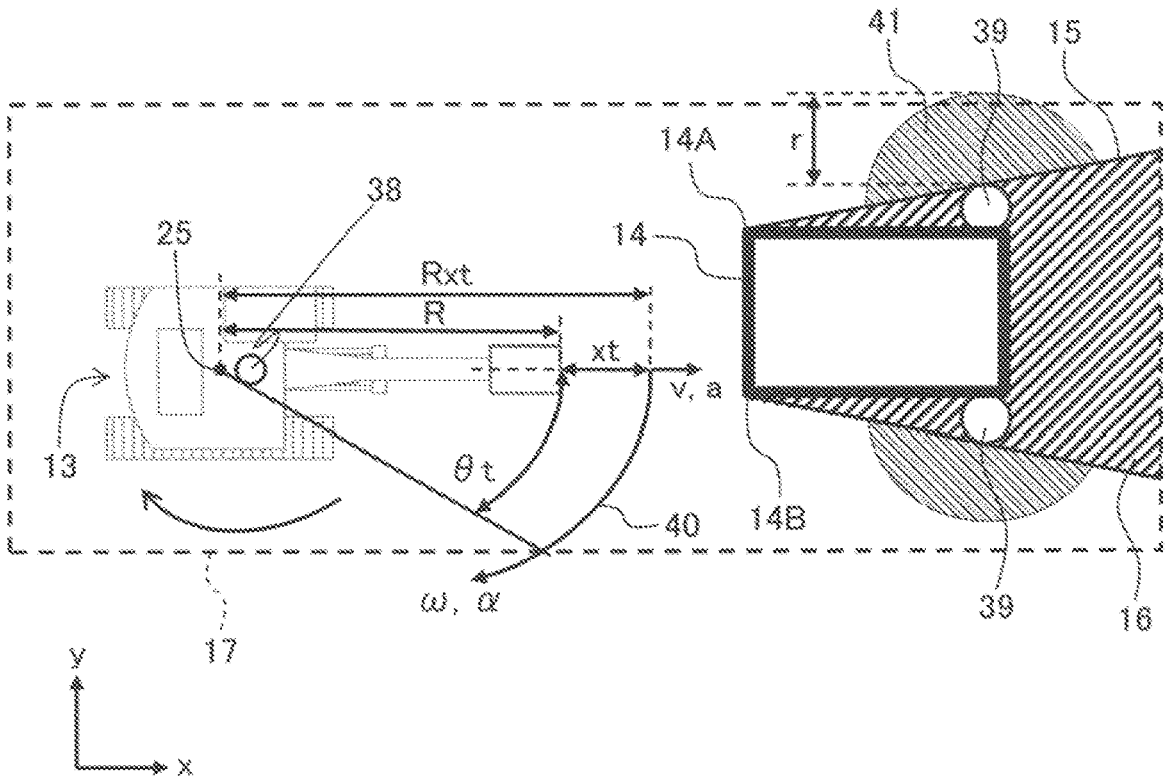
FIG. 18 is a view illustrating an assumed movement range of a moving body in the third embodiment.

As depicted in FIG. 17, since the type of the obstacle 14 can be discriminated through use of the image discrimination device 53 and the obstacle discrimination device 54, it is possible to deem a fixed distance in the rear as the obstacle 14 to narrow the dead angle 16. As a result, the position at which the moving body (worker) 39 may possibly exist can be narrowed, and the probability that the assumed movement range 41 of the moving body (worker) 39 may overlap with the velocity limit area 40 can be reduced.

Here, it is assumed that the position of the moving body (worker) 39 existing in the dead angle 16 exists at a position that contacts with a side face 56 of the obstacle 14 and a dead angle line 15 and that approaches nearest to the own vehicle 13. Further, when it is difficult to discriminate the obstacle 14 or when the obstacle 14 is not any registered one, the range of the dead angle is decided according to the dead angle detection method of the working example 1.

The configuration of the other part is similar to that of the first and second embodiments.

Also in the present embodiment configured in such a manner as described above, similar advantageous effects to those by the first and second embodiments can be achieved.

<Appendix>

It is to be noted that the present invention is not limited to the embodiments described above and includes various modifications and combinations without departing from the gist of present invention. Further, the present invention is not limited to what includes all configurations described hereinabove in connection with the embodiments and includes what does not include part of the configurations. Further, the configurations, functions, and so forth described above may partly or entirely be implemented, for example, by designing them in an integrated circuit. Further, the configurations, functions, and so forth described above may be implemented by software such that a processor interprets and executes a program for implementing the individual functions.

DESCRIPTION OF REFERENCE CHARACTERS

2: Cab
2a, 2b: Operation lever (operation device)
3: Track motor
5: Boom cylinder
6: Arm cylinder
7: Bucket cylinder
8: Boom
9: Arm
10: Bucket
13: Own vehicle
14: Obstacle (object)
15: Dead angle line
15: Both dead angle lines
16: Dead angle
17: Working range
18: Different vehicle
20: Lower track structure
21: Swing mechanism
22: Upper swing structure
23: Swing motor
24: Front work implement
25: Swing central axis
26: External environment recognition device
27: Swing angle sensor
30: Braking distance calculation section
31: Decision section
34: Posture sensor
35: Operation range calculation section
36: Obstacle position calculation section
37: Dead angle calculation section
38: Swing center
39: Moving body (worker)
40: Velocity limit area
41: Assumed movement range
42: Surface line
43: Posture calculation section
44: Controller
45: Moving body course prediction section
46: Position measurement device
47: Wireless communication device
48: Swing angle calculation section
49: Braking time calculation section
50: Velocity limit area calculation section
51: Front work implement velocity calculation section
52: Angular velocity calculation section
53: Image discrimination device
54: Obstacle discrimination device
59: Alarm device
60: Posture sensor
100: Hydraulic excavator

The invention claimed is:

1. A construction machine that includes:
    a main body including a lower track structure and an upper swing structure, the upper swing structure is provided swingably with respect to the lower track structure;
    a front work implement of articulated type attached to the upper swing structure and including a plurality of front members pivotably connected to each other; and a plurality of actuators that individually drive each of the plurality of front members of the front work implement, the construction machine comprising:

a plurality of posture sensors that are respectively provided on each of the plurality of front members of the front work implement and detect posture information of each of the plurality of front members;

an sensor that detects an object around the main body; and a controller configured to:

calculate a braking period of time as a period of time at which the front work implement stops based on the posture information of the plurality of front members detected by each of the plurality of posture detection devices, calculate a dead angle range that is a range that becomes a dead angle from a recognition range of the sensor, the dead angle arising from an object detected by the sensor based on the detection result of the sensor, calculate an assumed movement range that is a range within which a moving body assumed to exist in the dead angle is movable in the braking period of time based on the dead angle range, calculate a movable range that is a range within which the front work implement is movable in the braking period of time based on the posture information detected by each of the plurality of posture sensors, and control, as a preventive control for preventing contact between the moving body and the front work implement, the actuators of the front work implement such that the movable range of the front work implement and the assumed movement range of the moving body do not overlap with each other.

2. The construction machine according to claim 1, wherein the controller is further configured to notify an operator of the approach using an alarm device when the movable range of the front work implement and the assumed movement range of the moving body approach each other nearer than a distance determined in advance.

3. The construction machine according to claim 1, further comprising:

a position measurement device configured to measure a position of the construction machine at a work site; and a wireless communication device that acquires a position of another construction machine at the work site, the position being obtained by the other construction machine, and a detection result of an sensor provided on the other construction machine, wherein the controller is further configured to replace at least part of the dead angle range with the detection result of the sensor of the other construction machine when the dead angle range of the external environment recognition device and the detection result of the sensor of the other construction machine overlap with each other.

4. The construction machine according to claim 1, wherein the controller is further configured to discriminate a type of the object detected by the sensor and to calculate the dead angle range according to the discriminated type of the object.

* * * * *